US005224257A

United States Patent [19]

Murakoshi et al.

[11] Patent Number: 5,224,257

[45] Date of Patent: Jul. 6, 1993

[54] APPARATUS FOR MANUFACTURING A COIL ELEMENT

[75] Inventors: Toshiichi Murakoshi, Neyagawa; Hiroshi Kawazoe, Hirakata; Toshihiro Takahata, Mino; Masataka Tokunaga, Katano, all of Japan

[73] Assignee: Matsushita Electric Industrial Co., Ltd., Osaka, Japan

[21] Appl. No.: 739,841

[22] Filed: Aug. 2, 1991

[30] Foreign Application Priority Data

Aug. 4, 1990 [JP] Japan .................................. 2-207476

[51] Int. Cl.$^5$ .............................................. B23P 23/00

[52] U.S. Cl. ..................................... 29/564.1; 29/605; 140/92.1; 242/7.09; 242/7.14

[58] Field of Search .............................. 29/564.1, 605; 140/92.1; 242/7.09, 7.14

[56] References Cited

U.S. PATENT DOCUMENTS 4,558,835 12/1985 Sunaoka ............................ 242/7.09
4,790,063 12/1988 Kawazoe et al. ..................... 29/605

*Primary Examiner*—P. W. Echols
*Attorney, Agent, or Firm*—Wenderoth, Lind & Ponack

[57] ABSTRACT

A coil element is made by the steps of winding a coil wire around a plurality of guide portions arranged at a product pitch to form a plurality of coil portions while the coil wire is set in a development state, and rolling a bobbin on and along the coil wire to wind the coil wire around a side peripheral portion of the bobbin to manufacture the coil element. An apparatus for manufacturing the coil element includes a plurality of guide portions arranged adjustably between a winding operation pitch and a predetermined product pitch, a coil portion forming device for winding a coil wire around the guide portions when the guide portions are adjusted to the winding operation pitch to form a plurality of coil portions while the coil wire is set in a development state, a switch device for changing the pitch of the guide portions between the winding operation pitch and the predetermined product pitch, and a rolling device for rolling a bobbin on and along the coil wire to wind the coil wire around a side peripheral portion of the bobbin to manufacture the coil element.

20 Claims, 6 Drawing Sheets

APPARATUS FOR MANUFACTURING A COIL ELEMENT

BACKGROUND OF THE INVENTION

The present invention relates to an apparatus for manufacturing a coil element, such as a tracking coil for an optical pick-up, by winding a coil wire, formed with a plurality of coil portions thereon, onto a bobbin.

A coil element such as a tracking coil is essentially composed of a bobbin and a coil wire. A plurality of coil portions of the coil wire are bonded and fixed to predetermined positions of a peripheral side portion of the bobbin, with the ends of the coil wire being connected and fixed to the terminals of the bobbin. Furthermore, the peripheral side portion of the bobbin is formed with a peripheral groove so that slack portions of the coil wire are pushed therein.

In order to manufacture such a coil element by winding a coil wire onto a bobbin, a coil wire-forming apparatus includes a plurality of coil-forming portions for winding a coil wire thereon and a winding means for effecting coil portion formation by winding coil wire around respective coil forming portions. By use of the apparatus, the coil portions are first formed. Then, a bonding agent is applied to predetermined positions on the side periphery of the bobbin, and the coil wire is wound around the side periphery of the bobbin, bond-fixing the coil portions onto the predetermined positions. After temporarily fixing both ends of the coil wire by winding the ends onto the bobbin terminals, they are respectively connected and fixed to the terminals by soldering.

Meanwhile, conventionally, the operation of winding the coil wire around the side peripheral portion of the bobbin, the operation of rectifying loosened coil wire portions, and operation of connecting the coil wire ends to the bobbin terminals are performed manually. However, for the improvement of productivity, the mechanization of the respective operations, automating the entire manufacturing process, has been demanded.

However, for automation of the manufacture of the coil element, there are the following considerations in the respective operations.

(1) Winding Operation of Coil Wire

The peripheral side portion of the bobbin is of an approximately rectangular shape, with terminals for connecting the coil wire ends projecting therefrom. The coil wire has a plurality of coil portions formed by winding coil material several turns and coil material portions for connecting adjacent coil portions connected to each other. Accordingly, when the coil wire is wound around the peripheral side portion of the bobbin, if a uniform winding method is employed, the local unevenness in the winding force tends to take place in the coil wire. In strongly wound portions, the coil wire may be damaged due to excessive tension applied thereto. In loosely wound portions, the amount of slack in the coil wire becomes large, resulting in an adverse affect on the product. If the winding operation, requiring the change of winding modes in accordance with the shape of the bobbin and the positions of the coil portions in the coil wire, is to be mechanized as it is, the apparatus therefor will become complicated and expensive.

(2) Reforming Operation for the Slackness of the Coil Wire

In the stage where the coil wire is wound around the peripheral side portion of the bobbin, the coil wire portion between the coil portions is outwardly loosened slightly, and this loosened portion must be pushed into the peripheral groove provided on the peripheral side portion of the bobbin, thus to be reformed.

Although this operation is performed manually, in the case of automated manufacture, a reformation process becomes necessary, resulting in an increase in the number of processes, and a special apparatus for the reforming operation must be employed.

(3) Temporary Fixing Operation for the Coil Wire Ends

When the coil wire ends are connected and fixed to the bobbin terminals by soldering, etc., the ends must be first temporarily fixed by winding the ends around the terminals.

Meanwhile, in the case of winding the ends around the terminals by using the winding means, the winding operation around the terminal has to be conducted at a position apart from the coil wire in the direction of the length of the terminal so that the end holding member of the coil winding means will not hang by the coil wire. However, in the case where the terminal is small or where the space around the terminal is not sufficient, since the winding operation using the winding means is difficult to perform, it is difficult to mechanize the temporary fixing operation.

(4) Coil Wire-forming Operation

In forming the coil portions, although the size of the space necessary for the winding operation is predetermined, when the predetermined product pitch between the coil portions is small, it is difficult to mechanize the forming operation of such a coil wire, because securing the space around the coil portion is difficult.

SUMMARY OF THE INVENTION

The present invention has been developed with a view to substantially solving the above described disadvantages.

A first object of the present invention is to provide a coil element manufacturing method which is capable of winding a coil wire around the peripheral side portion of a bobbin with a comparatively simple apparatus without applying an excessive tension and with a small amount of slack.

A second object of the present invention is to provide a coil element manufacturing method which is capable in performing a reforming operation for the slack in a coil wire without increasing the number of processes and without using an exclusive apparatus.

A third object of the present invention is to provide a coil element manufacturing method which is capable of mechanizing a temporary fixing operation for coil wire ends even when bobbin terminals are small or the space around the terminals is not sufficient.

A fourth object of the present invention is to provide a coil element manufacturing apparatus which is capable of setting the pitch between coil portions at a predetermined product pitch, and capable of performing a winding operation for the coil portions without any trouble.

In order to accomplish these and other objects of the present invention, according to a first aspect of the present invention, there is provided a method for manufacturing a coil element, comprising the steps of:

winding a coil wire around a plurality of guide portions arranged at a product pitch to form a plurality of coil portions while the coil wire is set in a development state; and rolling a bobbin on and along the coil wire to wind the coil wire around a peripheral side portion of the bobbin to manufacture the coil element.

According to a second aspect of the present invention, there is provided a method for manufacturing a coil elment which further comprises a step of tranferring the bobbin with the coil wire wound therearound by holding the bobbin with a holding means of a transfer means, while a slack portion of the coil wire is reformed by pushing the slack portion into a peripheral groove on the bobbin with the holding means of the transfer means.

According to a third aspect of the present invention, there is provided a method for manufacturing a coil element which further comprises the steps of:

forming a loop portion at each end of the coil wire, the loop portion having a diameter not less than a diameter of a corresponding terminal of the bobbin;

inserting the terminals into the loop portions of the coil wire respectively before or after the winding step of the coil wire; and pulling the developed coil wire to tightly wind the loop portions of the coil wire around the terminals to temporarily fix the loop portions thereof to the terminals.

According to a fourth aspect of the present invention, there is provided an apparatus for manufacturing a coil element which comprises:

a plurality of guide portions arranged adjustably between a winding operation pitch and a predetermined product pitch;

a coil portion-forming device for winding a coil wire around the guide portions when the guide portions are adjusted to the winding operation pitch to form a plurality of coil portions while the coil wire is set in a development state;

a switch device for changing the pitch of the guide portions between the winding operation pitch and the predetermined product pitch; and a rolling device for rolling a bobbin on and along the coil wire to wind the coil wire around a peripheral side portion of the bobbin to manufacture the coil element.

According to the first aspect of the present invention, by rolling the bobbin on and along the coil wire respective positions of the peripheral side portion of the bobbin can be overlapped sequentially on the corresponding portions of the coil wire, and in the overlapped state the coil wire can be sequentially would around the peripheral side portion of the bobbin in a shape according to the peripheral side portion. Therefore, the winding operation may be performed without applying any excessive tension to the coil wire and with a small amount of slack. Furthermore, by forming the coil wire in the developed state, not only can the respective positions of the bobbin side peripheral portion be easily overlapped on the corresponding positions of the coil wire, but also the operation of forming a plurality of coil portions, the operation of setting the coil portion pitch at a predetermined product pitch, etc., are easy, whereby the mechanization of the coil element manufacturing operation can be made easy.

According to the second aspect of the present invention, since the slackened portions of the coil wire can be pushed in the peripheral side grooves of the bobbin during the transfer operation of the bobbin, the coil wire reforming operation can be performed without increasing the number of processes and without employing an exclusive apparatus.

According to the third aspect of the present invention, the loop performing operation can be performed without being restricted by conditions such as the terminal size or the space around the terminal. Therefore, by inserting respective terminals into the thus formed first and second loop portions and by tightening respective loop portions, the temporary fixing operation for the coil wire ends can be mechanized, even when the terminals are small or there is not sufficient space around the terminal.

According to the fourth aspect of the present invention, when coil portions are formed by using the coil portion forming device, the coil winding operation can be performed without any trouble by changing over the pitch between adjacent coil portions to a winding operation pitch. The winding operation with the coil portion forming device can be carried out by means of a switch means, and by changing over the pitch to a predetermined product pitch after formation thereof by means of the switch means, and the pitch between coil portions can be set at a predetermined product pitch.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
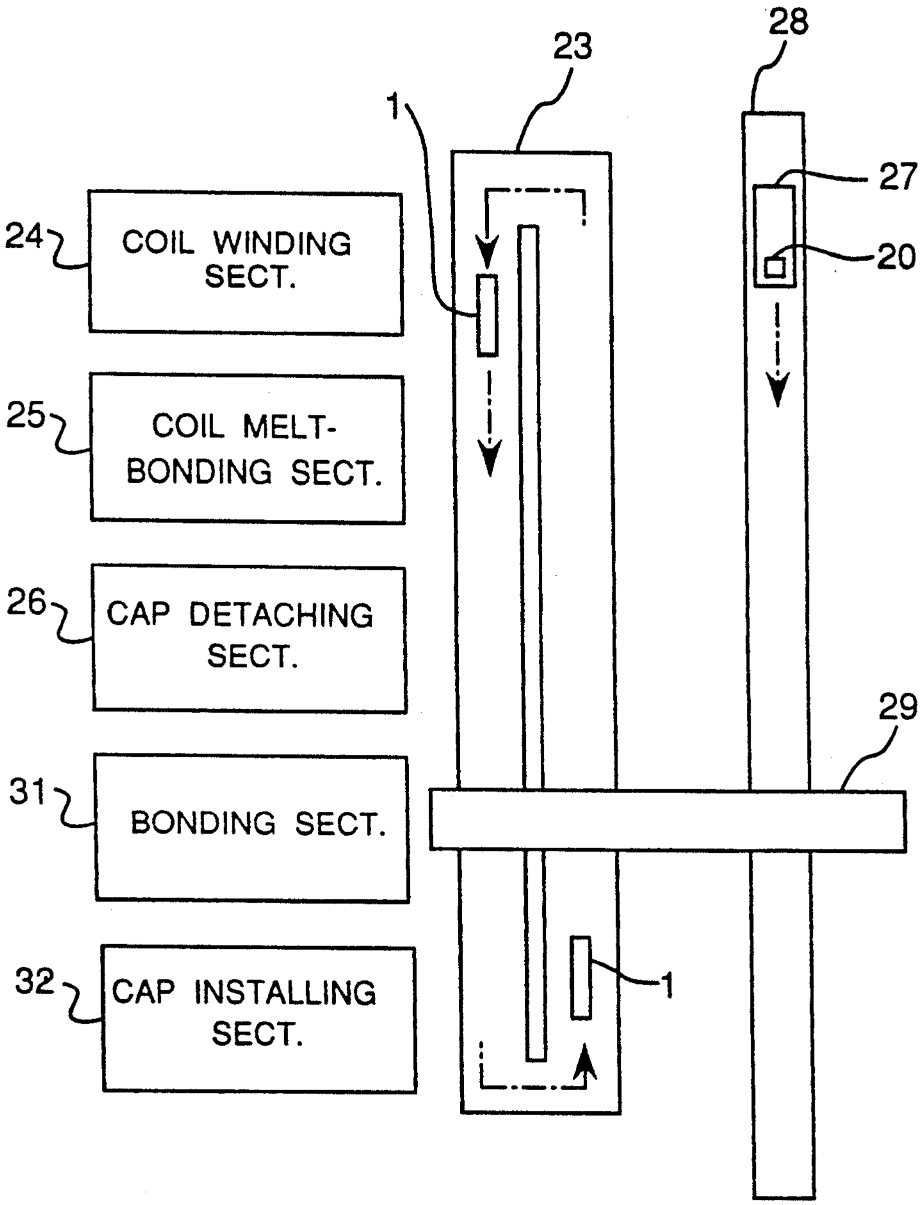
FIG. 1 is an overall arrangement diagram showing a schematic constitution of a preferred embodiment of the present invention.

Before the description of the present invention proceeds, it is to be noted that like parts are designated by like reference numerals throughout the accompanying drawings.

FIGS. 1 to 8 show a preferred embodiment wherein the present invention is applied to a manufacturing method for a tracking coil for an optical pick-up.

Figure 2:
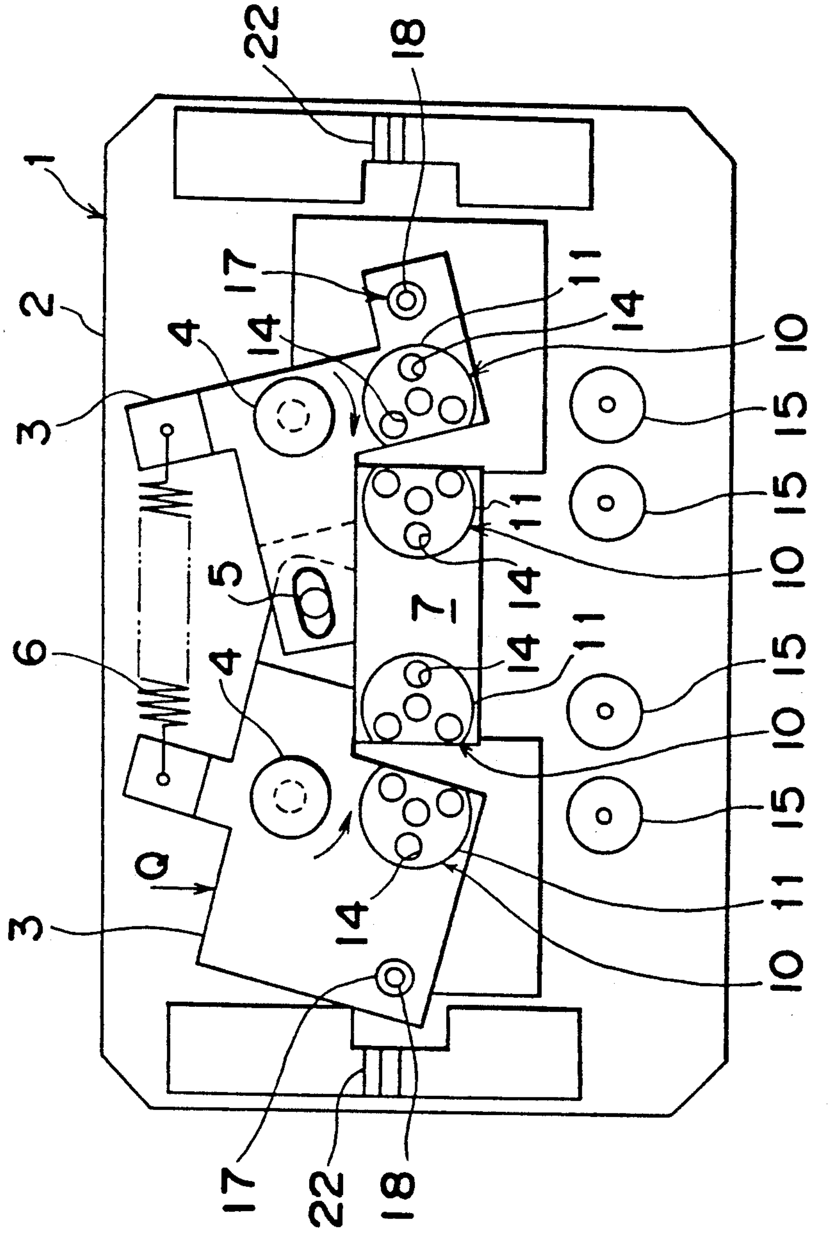
FIG. 2 is a plan view showing the essential part of a coil wire forming apparatus in the embodiment.
Figure 3:
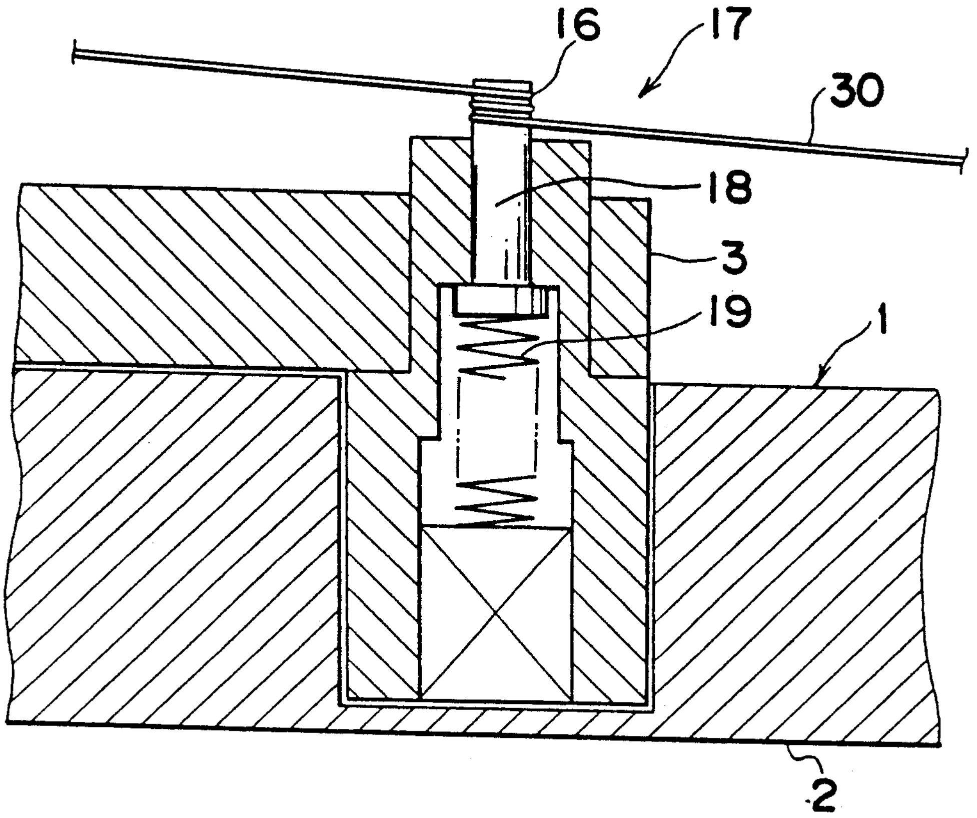
FIG. 3 is a partial longitudinal sectional view showing the formation of a loop portion of a coil wire.
Figure 4:
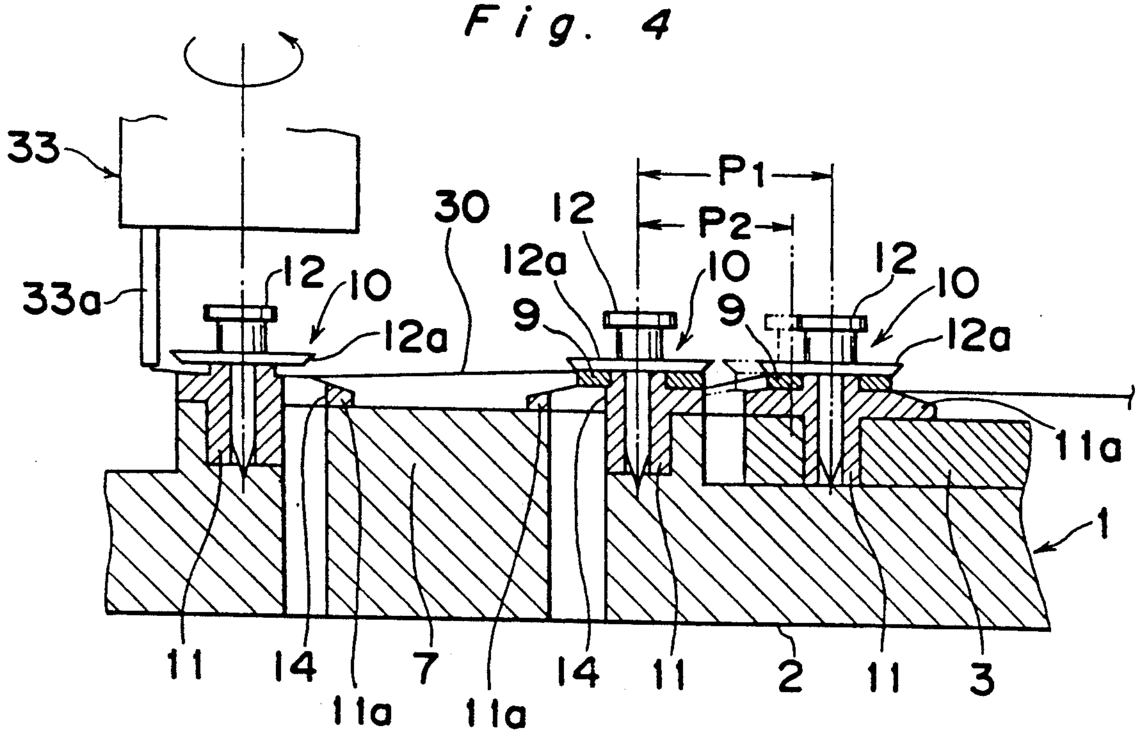
FIG. 4 is a partial longitudinal sectional view showing the formation of coil portions.

FIGS. 2 to 4 show a coil wire jig 1 in which two movable plates 3 are provided on a base 2 so as to be movable around respective support axes 4. Both movable plates 3 are connected to each other so as to rotate in opposite directions by a connection formed by a pin 5 projectingly provided on one movable plate 3 inserted into a long hole provided on the other movable plate 3. Furthermore, a tension coil spring 6 is provided between both movable plates 3 so as to urge the connected portions to come into contact with the end surface of a fixed portion 7 of the base 2 at all times.

The fixed portion 7 and the movable plates 3 have guide portions 10 (coil-forming portions) for forming coil portions 9 by winding a coil wire 30 therearound arranged thereon at four positions in total in a development state as shown in FIG. 4. The pitch between the adjacent guide portions 10 on the movable plate 3 and the fixed portion 7 is at a maximum when the movable plates 3 are in the state as shown in FIG. 2 under the urging force of the tension coil spring 6, and at a minimum when the movable plates 3 are rotated against their urging force. Namely, by applying a force indicated by the arrow Q in FIG. 2 to the movable plate 3, it is possible to switch the pitch over between a winding operation pitch $P_1$, wherein a winding operation by a winding machine 33 may be carried out, and a predetermined product pitch $P_2$, shown by the chain line in FIG. 4. The movable plates 3, rotating about their axes 4, connected by pin 5 and biased by spring 6, thus constitute a switch device for changing the pitch of the guide portions 10 between the winding operation pitch and the product pitch. Furthermore, the distance between the guide portions 10 on the fixed portion 7 is approximately equal to the length along the peripheral side portion of a bobbin 20 between two sets of coil portions 9 when the respective coil portions 9 formed on the guide portions 10 are bonded to predetermined positions on the peripheral side portion of the bobbin 20 (refer to FIGS. 7 and 8).

The guide portion 10 is provided with a lower guide member 11, inserted into and fixed to each of the movable plate 3 and the fixed portion 7, and a cap member 12, detachably inserted into and fixed to the lower guide member 11. The lower guide member 11 and the cap member 12 are respectively provided with flange portions 11*a* and 12*a*, and in the state where the cap member 12 is inserted and fixed, thickness control of the coil portion 9 may be performed by both flange portions 11*a* and 2*a*. Furthermore, the flange portion 11*a* of the lower guide member 11 has through holes 14 for receiving push-up pins 13, which pierce through either the movable plate 3 or the fixed portion 7 and the base 1, and are provided in order to detach the formed coil portions 9 from the lower guide members 11 (refer to FIG. 6). On the base 1, there are provided cap receivers 15 for temporarily receiving cap members 12 that have been removed.

As shown in FIG. 3, there is provided, on the movable plate 3, a loop-forming portion 17 for forming a loop portion 16 by winding of the coil wire 30. This loop-forming portion 17 has a pin 18 capable of projecting from the upper surface side of the movable plate 3 urged in the projecting direction at all times b a compression coil spring 19. The diameter of this pin 18 is set to be larger than the diameter of a terminal 21 of the bobbin 20 (refer to FIG. 5). Furthermore, the terminal 21 in the present embodiment has a rectangular section. Outward of each loop-forming portion 17 is provided a clamp 22 capable of holding the coil wire 30.

A method for manufacturing an optical pick-up tracking coil by using the coil wire jig 1 constituted as described above will be described below.

As shown in FIG. 1, a coil wire forming line 23 circulates and transfers the coil wire jig 1 as shown by the arrows. A coil winding section 24 is arranged to form the coil portions 9 and the loop portions 16 by winding the coil wire 30 around the guide portions 10 and the loop-forming portions 17, respectively, of the coil wire jig 1, and holding both ends with the clamps 22. A coil melt bonding section 25 reforms the ring shapes of the coil portions 9 by self-melt-bonding, thus finishing a coil wire 30 in a development state. A cap detecting section 26 detaches the cap members 12 from the guide portions 10, and places them temporarily on the Cap receivers 15. A bonding section 31 applies a bonding agent to predetermined positions of a bobbin 20, the bobbin 20 having been transferred by a transfer means 29 from a bobbin transfer line 28. The bobbin transfer 28 is used for transferring a pallet 27 with a bobbin 20 loaded thereon. Thereafter the developed coil wire 30 on the coil wire jig 1 is assembled on the bobbin 20. A cap-installing section 32 installs the cap members 12 onto the guide portions 10 of the coil wire jig 1 after the coil wire 30 has been removed.

The procedure in the coil winding section 24 will be described below with reference to FIGS. 2 to 4.

First, after the coil wire 30, supplied from a nozzle 33*a* (refer to FIG. 4) of the coil winding machine 33 (coil winding means), is held by one of the clamps 22 of the coil wire jig 1, the loop portion 16 is formed by winding one end of the coil wire 30 several turns around the pin 18 of one loop-forming portion 17, as shown in FIG. 3. Next, the coil portions 9 are formed by winding the coil wire 30 sequentially around respective guide portions 10, as shown in FIG. 4. This winding operation is performed by up and down, right and left, and horizontal rotary movements of the nozzle 33*a*. At this time, since the movable plates 3 are in a position where the pitch between the confronting guide portions 10 is the winding operation pitch $P_1$ at which pitch the winding operation by the nozzle 33*a* of the winding machine 33 may be carried out, the winding operation at the adjacent guide portions 10 may be performed without any trouble. After forming another loop portion 16 by winding the other end of the coil wire 30 several turns around the pin 18 of the other loop-forming portion 17, the coil wire 30 is held with the other clamp 22 and cut. After forming the coil portions 9, one movable plate 3 is pushed in the direction of the arrow Q in FIG. 2 so as to make the guide portions 10 on the respective movable plates 3 close to the guide portions on the fixed portion 7, thereby shortening the pitch between both guide portions 10 on the movable plate 3 and the fixed portion 7 to the predetermined product pitch $P_2$.

Figure 5:
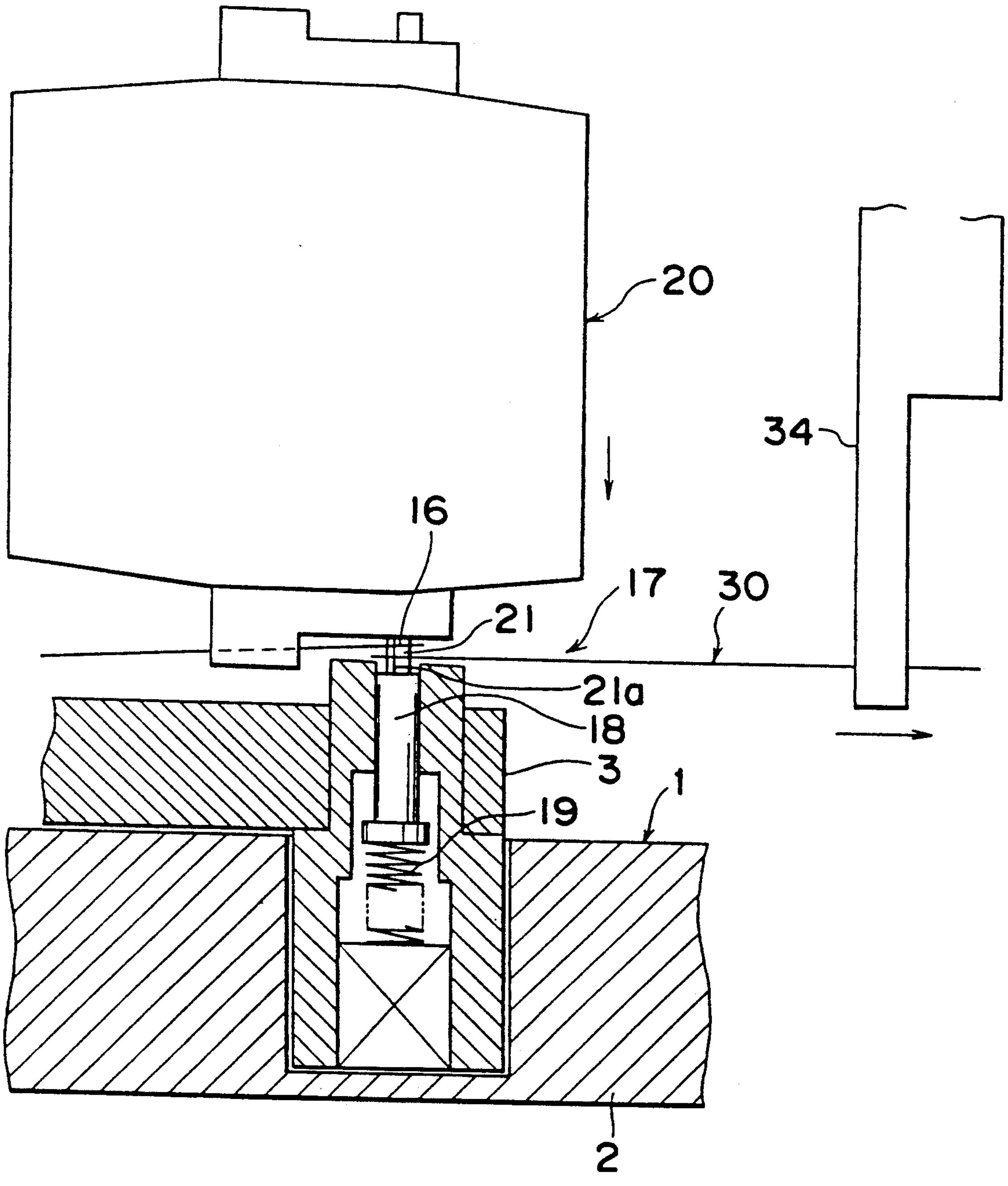
FIG. 5 is a partial longitudinal sectional view showing a state where a bobbin terminal is inserted into a loop portion.

In the bonding section 31, the bobbin 20 transferred thereto by the transfer means 29 is, after having a bonding agent applied thereto at predetermined positions on the peripheral side portion thereof, brought into contact with the upper end surface of the pin 18 of the coil wire jig I with the terminal 21 thereof being directed downward. In that state, as shown in FIG. 5, the bobbin 20 is lowered so as to bury the pin 18 in the movable plate 3, whereby the loop portion 16 is transferred from the pin 18 to the terminal 21. Next, the end of the coil wire 30 is pulled by a chuck 34 of the transfer means 29 to tightly wind the coil wire 30 around the terminal 21, and the excess end portion of the coil wire 30 is cut off with an edge 21*a* of the terminal 21. Furthermore, although the terminal 21 of the present embodiment is of a rectangular section, in the case of a terminal of a circular section, a cut-off edge may be preliminarily forced thereon, or the coil wire 30 may be cut at a position close to the terminal by simply strongly pulling the end utilizing the curved portion on the terminal surface.

Figure 6:
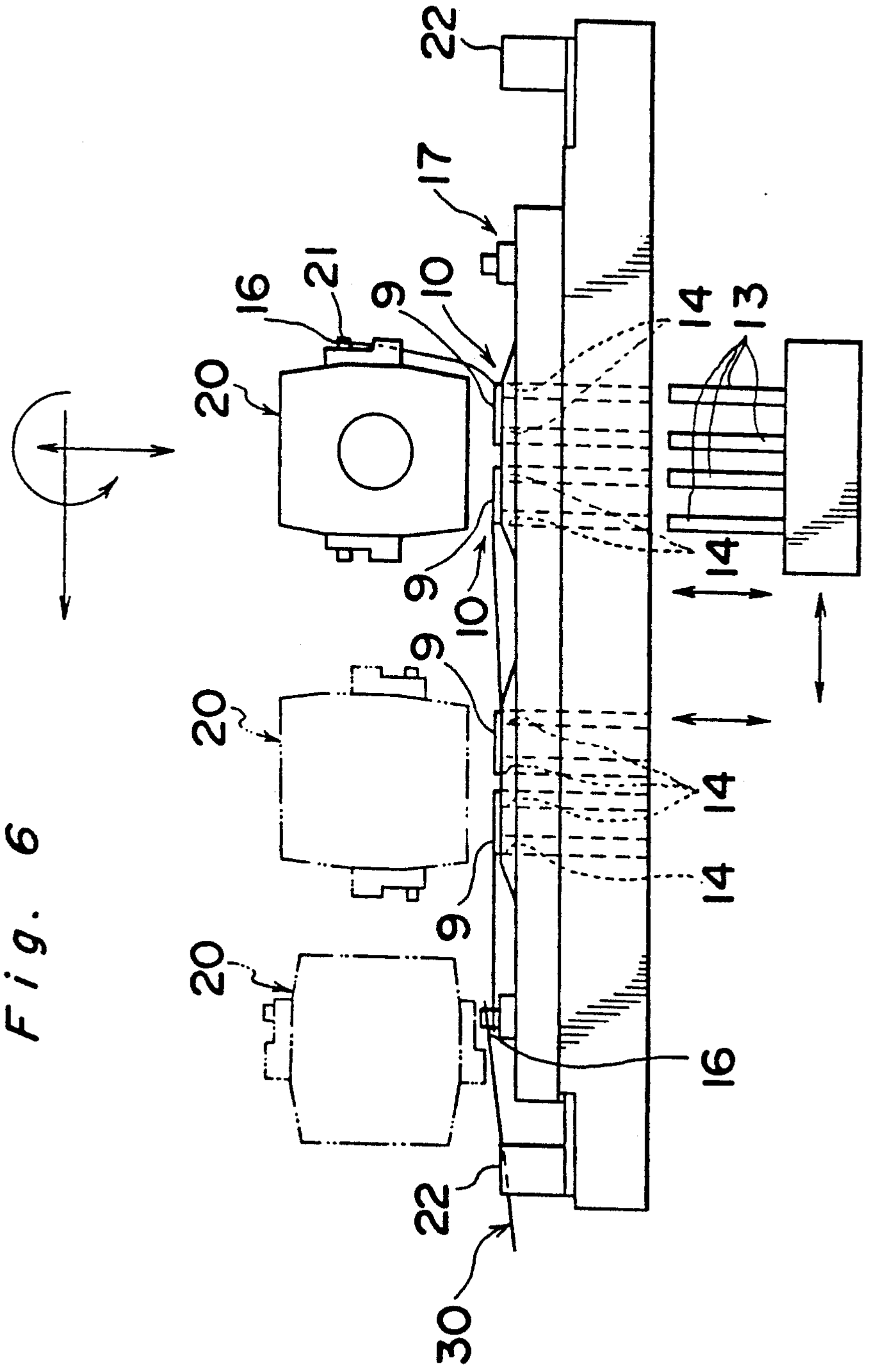
FIG. 6 is a schematic front view showing a state where the coil wire is wound around a side peripheral portion of a bobbin.
Figure 7:
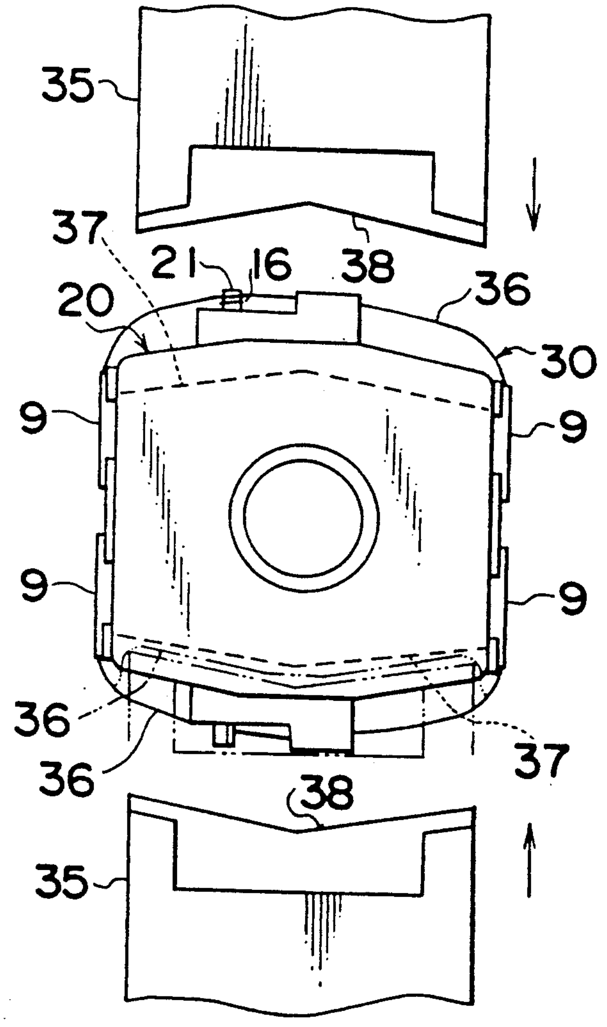
FIG. 7 is a partial front view showing a reforming of a slacked portion of the coil wire.
Figure 8:
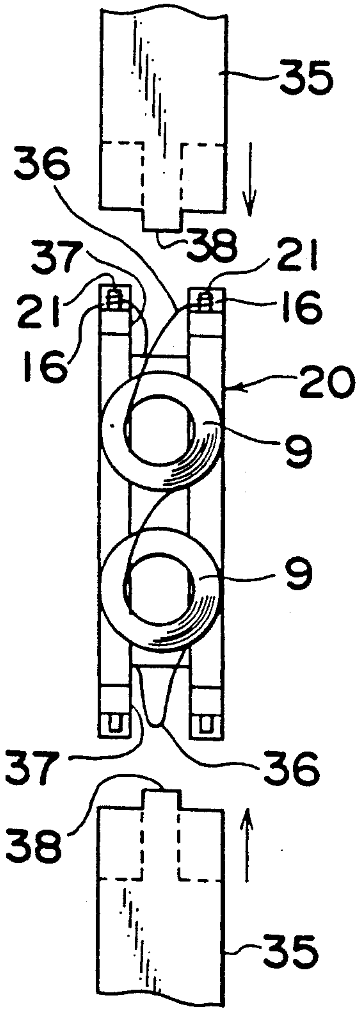
FIG. 8 is a partial side view showing the reforming of the slackened portion.

Next, by causing the bobbin 20, having an approximately rectangular shape, to perform rotary or rolling motions around a horizontal axis, up and down motions, and advance motions in synchronization with the transfer means 29, as shown by the arrows in FIG. 6, the bobbin 20 is rolled on the coil wire 30. Thereby, respective portions on the peripheral side portion of the bobbin 20 can be sequentially overlapped onto respective portions of the coil wire 30, and in the overlapped state the coil wire 30 is wound sequentially around the peripheral side portion of the bobbin 20. Accordingly, the winding operation for the coil wire 30 can be performed without applying excessive tension and with a small amount of slack, and by pushing the bobbin portions having the bonding agent applied thereon against the coil portions 9 on the guide portions 10, the coil portions 9 can be bonded to the bobbin 20. Furthermore, the push-up pins 13 are operated from below the coil wire jig 1 in accordance with the rolling motion of the bobbin 20 to thus forcibly remove the coil portions 9 from the guide portions 10, whereby the winding operation may be achieved smoothly.

Although the bobbin 20 wound with the coil wire 30 therearound is returned to the bobbin transfer line 28 by the transfer means 29, slack portions 36 of the coil wire 30 are reformed by pushing the slack portions into peripheral grooves 37 of the bobbin 20 with holding chucks 35 of the transfer means 29 during the transfer. More specifically, a projecting portion 38, which is of a shape copying the internal shape of the peripheral groove 37, but a little smaller, is provided on each end of the holding chucks 35. When the bobbin 20 is held by the holding chucks 35, the slack portions 36 of the coil wire 30 are pushed into the peripheral grooves 37 with the projecting portions 38. Since the amount of slack in the slack portions 36 is held small in the coil wire winding operation at the bonding section 31, the respective slack portions 36 can be reformed comparatively easily and certainly.

The optical pick-up tracking coil manufactured in this manner is transferred onto the pallet 27 on the bobbin transfer line 28 to be delivered. On the other hand, the coil winding jig 1 has the cap members 12 installed onto the respective guide portions 10 at the cap member installing section 32, and is then transferred to the coil winding section 24 after one circulation.

According to the embodiment of the present inventions, since, by the simple constitution of a bobbin being rolled on a coil wire in the development state, the coil wire winding operation can be effected without applying any excessive tension and with a small amount of slack, the winding operation for the coil wire can be mechanized by a comparatively simple apparatus construction, and the automation of the coil element manufacture can be achieved.

Furthermore, by utilizing a holding means during transfer of the bobbin, with the coil wire wound therearound, the slackness of the coil wire can be reformed without increasing the number of processes and without employing an exclusive apparatus.

Moreover, even where the bobbin terminal is small or where the winding operation around the terminal is difficult because of insufficient space around the terminals, since the temporary fixing operation for the coil wire end can be performed by using the winding means, the temporary fixing operation for the coil wire end can be mechanized so as to achieve the automation of the coil element manufacture.

Additionally, since the coil portion pitch can be set to a predetermined product pitch by the switch device after formation of the coil portions, and the winding operation for the coil portions by the coil portion-forming device can be performed with no trouble at the time of the formation, the formation operation for the predetermined coil wire can be mechanized so as to achieve the automation of the coil element manufacture.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims.

We claim:

1. An apparatus for manufacturing a coil element, comprising:

a plurality of coil wire guide portions for receiving coil wire therearound;

a switch device connected with said coil wire guide portions for changing the pitch of said coil wire guide portions between a winding operation pitch and a predetermined product pitch;

a coil portion forming device for winding coil wire around said coil wire guide portions when said coil wire guide portions have the winding operation pitch and forming a plurality of coil portions around respective said coil wire guide portions; and a rolling device for rolling a peripheral side portion of a bobbin on and along the coil wire wound around said coil wire guide portions such that the coil wire with said plurality of coil portions is wound around the peripheral side portion of the bobbin.

2. The apparatus of claim 1, and further comprising a transfer means for transferring the bobbin with the coil wire wound therearound, said transfer means comprising a holding device for holding the bobbin and pushing slack portions of the coil wire on the bobbin into a peripheral groove on the peripheral side portion of the bobbin.

3. The apparatus of claim 1, and further comprising:

a loop forming portion for each end of the coil wire, each said loop forming portion comprising a pin for receiving the coil wire looped therearound, each said pin having a diameter greater than or equal to a corresponding terminal on the bobbin such that the coil wire looped around each said pin can be transferred to a respective terminal; and a pulling device for holding and pulling on the end of the coil wire to tighten the coil wire on the terminals of the bobbin after the coil wire has been transferred thereto from said pins.

4. The apparatus of claim 1, wherein:

two of said coil wire guide portions are fixed relative to a base; and said switching means comprises two plates each rotatably mounted so as to be pivotable about respective axes on said base, another said coil wire guide portion being mounted on each said plate.

5. The apparatus of claim 4, wherein said plates are connected together by a pin and slot connection such that rotation of one said plate ensures rotation of the other said plate in an opposite rotational direction, and said plates are biased by a tension spring interconnecting said plates to a position defining said winding operation pitch.

6. The apparatus of claim 1, wherein each said coil wire guide portion comprises a lower guide member having a central aperture and a cap member removably received in said central aperture, each of said lower guide and cap members having a flange, and said flanges of respective said guide portions defining an annular space therebetween for receiving coil wire.

7. The apparatus of claim 1, wherein a base has said plurality of coil wire guide portions and said switching device mounted thereon, said base further having a pair of loop forming portions thereon for holding loops of the coil wire thereon, with said plurality of coil wire guide portions located between said pair of loop forming portions on said base.

8. The apparatus of claim 7, wherein said base further has a clamp thereon adjacent each said loop forming portion for holding the coil wire.

9. The apparatus of claim 7, wherein each said loop forming portion comprises a pin slidably mounted relative to said base and biased to project upwardly therefrom such that a loop of coil wire around said pin can be transferred to a respective terminal of the bobbin upon engagement of said pin with a terminal.

10. The apparatus of claim 1, and further comprising a device for releasing the coil wire and the coil portions from said plurality of coil wire guide portions upon rotation of the bobbin for winding of the coil wire around the bobbin.

11. The apparatus of claim 10, wherein said device for releasing comprises a plurality of through holes in said plurality of coil wire guide portions and a plurality of pins moveable through said through holes for engagement with the coil wire.

12. An apparatus for manufacturing a coil element, comprising:

a plurality of coil wire guide portions;

switching means for changing the pitch of said plurality of coil wire guide portions between a winding operation pitch and a predetermined product pitch;

a coil portion forming means for supplying a coil wire and winding the coil wire around said plurality of coil wire guide portions to form a plurality of coil portions when said switching means has said coil wire guide portions at said winding operation pitch; and rolling means for rotating a peripheral side portion of bobbin along and on a coil wire and coil portions formed thereby so as to wind the coil wire around the bobbin.

13. The apparatus of claim 12, wherein:

two of said coil wire guide portions are fixed relative to a base; and said switching means comprises two plates each rotatably mounted so as to be pivotable about respective axes on said base, another said coil wire guide portion being mounted on each said plate.

14. The apparatus of claim 13, wherein said plates are connected together by a pin and slot connection such that rotation of one said plate ensures rotation of the other said plate in an opposite rotational direction, and said plates are biased by a tension spring interconnecting said plates to a position defining said winding operation pitch.

15. The apparatus of claim 12, wherein each said coil wire guide portion comprises a lower guide member having a central aperture and a cap member removably received in said central aperture, each of said lower guide and cap members having a flange, and said flanges of respective said guide portions defining an annular space therebetween for receiving coil wire.

16. The apparatus of claim 12, wherein a base has said plurality of coil wire guide portions and said switching means mounted thereon, said base further having a pair of loop forming portions thereon for holding loops of the coil wire thereon, with said plurality of coil wire guide portions located between said pair of loop forming portions on said base.

17. The apparatus of claim 16, wherein said base further has a clamp thereon adjacent each said loop forming portion for holding the coil wire.

18. The apparatus of claim 16, wherein each said loop forming portion comprises a pin slidably mounted relative to said base and biased to project upwardly therefrom such that a loop of coil wire around said pin can be transferred to a respective terminal of the bobbin upon engagement of said pin with a terminal.

19. The apparatus of claim 12, and further comprising a means for releasing the coil wire and the coil portions from said plurality of coil wire guide portions upon rotation of the bobbin for winding of the coil wire around the bobbin.

20. The apparatus of claim 19, wherein said means for releasing comprises a plurality of through holes in said plurality of coil wire guide portions and a plurality of pins moveable through said throughholes for engagement with the coil wire.

* * * * *